United States Patent
Esbensen

(10) Patent No.: US 7,124,427 B1
(45) Date of Patent: Oct. 17, 2006

(54) METHOD AND APPARATUS FOR SURVEILLANCE USING AN IMAGE SERVER

(75) Inventor: Daniel Esbensen, Kihei, HI (US)

(73) Assignee: Touch Technologies, Inc., San Diego, CA (US)

( * ) Notice: Subject to any disclaimer, the term of this patent is extended or adjusted under 35 U.S.C. 154(b) by 0 days.

(21) Appl. No.: 09/482,181

(22) Filed: Jan. 12, 2000

Related U.S. Application Data

(60) Provisional application No. 60/131,990, filed on Apr. 30, 1999.

(51) Int. Cl.
*H04N 7/173* (2006.01)

(52) U.S. Cl. .............. 725/109; 725/114; 725/115; 725/117; 348/14.01; 348/152; 348/153; 348/154; 348/155; 348/143; 348/159; 340/541

(58) Field of Classification Search .............. 348/143, 348/152, 17, 12, 13, 15, 222, 7, 14.03, 14.12, 348/14.13, 14.14, 153, 154, 155, 159, 14.01; 382/239, 240, 131, 132, 232; 709/219, 232; 725/109, 108, 114, 115, 117; 340/541

See application file for complete search history.

(56) References Cited

U.S. PATENT DOCUMENTS

| | | | |
|---|---|---|---|
| 4,145,715 A | 3/1979 | Clever | |
| 4,249,207 A * | 2/1981 | Harman et al. | 348/152 |
| 4,308,559 A | 12/1981 | Schiff | |
| 4,408,224 A | 10/1983 | Yoshida | |
| 4,630,110 A | 12/1986 | Cotton et al. | |
| 4,814,869 A | 3/1989 | Oliver, Jr. | |
| 4,922,339 A | 5/1990 | Stout et al. | |
| 4,928,175 A | 5/1990 | Haggren | |
| 4,943,854 A | 7/1990 | Shiota et al. | |
| 5,097,328 A * | 3/1992 | Boyette | 348/150 |
| 5,105,183 A | 4/1992 | Beckman | |
| 5,202,661 A | 4/1993 | Everett et al. | |
| 5,237,408 A | 8/1993 | Blum et al. | |
| 5,384,588 A | 1/1995 | Martin et al. | |
| 5,406,324 A | 4/1995 | Roth | |
| 5,471,239 A | 11/1995 | Hill | |
| 5,473,364 A | 12/1995 | Burt | |
| 5,491,511 A | 2/1996 | Odle | |
| 5,517,236 A | 5/1996 | Sergeant et al. | |
| 5,606,364 A | 2/1997 | Kim | |
| 5,657,076 A | 8/1997 | Tapp | |
| 5,751,345 A | 5/1998 | Dozier et al. | |

(Continued)

FOREIGN PATENT DOCUMENTS

JP     02 162890 A     6/1990

(Continued)

OTHER PUBLICATIONS

Axis 240 Camera Server, Products Website, http://www.intelligent.com/product/cam240.htm.

(Continued)

*Primary Examiner*—Shawn S. An
(74) *Attorney, Agent, or Firm*—Stephen J. LeBlanc; Quine Intellectual Property Law Group, LLC

(57) ABSTRACT

Methods and apparatus for an image server surveillance system provide for as control and coordination of cameras that may be widely deployed, analyzing data from multiple cameras, making data available in such a way that it can be efficiently transmitted over a network and can be easily displayed to potentially a large number of users, and displaying and controlling image data by existing client software.

20 Claims, 3 Drawing Sheets

U.S. PATENT DOCUMENTS

| | | | |
|---|---|---|---|
| 5,751,346 | A | 5/1998 | Dozier et al. |
| 5,806,005 | A * | 9/1998 | Hull et al. ............... 348/17 |
| 5,953,055 | A * | 9/1999 | Huang et al. ............ 348/155 |
| 5,956,081 | A | 9/1999 | Katz et al. |
| 5,982,418 | A | 11/1999 | Ely |
| 6,011,547 | A * | 1/2000 | Shiota et al. ............ 382/261 |
| 6,018,774 | A * | 1/2000 | Mayle et al. ............ 709/250 |
| 6,023,241 | A * | 2/2000 | Clapper .................. 342/190 |
| 6,058,428 | A * | 5/2000 | Wang et al. ............. 709/232 |
| 6,076,111 | A * | 6/2000 | Chiu et al. .............. 709/232 |
| 6,078,756 | A * | 6/2000 | Squilla et al. ........... 396/300 |
| 6,085,152 | A * | 7/2000 | Doerfel .................. 348/139 |
| 6,144,772 | A * | 11/2000 | Garland et al. .......... 382/239 |
| 6,166,729 | A * | 12/2000 | Acosta et al. ............. 348/6 |
| 6,166,763 | A | 12/2000 | Rhodes et al. |
| 6,167,469 | A * | 12/2000 | Safai et al. ............... 348/22 |
| 6,182,127 | B1 * | 1/2001 | Cronin, III et al. ....... 382/232 |
| 6,226,031 | B1 * | 5/2001 | Barraclough et al. .... 348/14.13 |
| 6,271,752 | B1 * | 8/2001 | Vaios ..................... 340/541 |
| 6,411,209 | B1 | 6/2002 | Lyons et al. |
| 6,421,080 | B1 | 7/2002 | Lambert |
| 6,441,734 | B1 | 8/2002 | Gutta et al. |
| 6,476,858 | B1 | 11/2002 | Ramirez Diaz et al. |

FOREIGN PATENT DOCUMENTS

| | | |
|---|---|---|
| JP | 07 307944 A | 11/1995 |
| WO | WO 99 11069 | 3/1999 |

OTHER PUBLICATIONS

Axis 200+ Webcamera, Products Website, http://www.intelligent.com/product/cam200+.htm.

"Hunters on the Reef," CoralCam at the Waikiki Aquarium, http://waquarium.mic.hawaii.edu/coralcam/.

"How it works," CoralCam at the Waikiki Aquarium, http://waquarium.mic.hawaii.edu/coralcam/how.html.

"Elephant Cam—Updates Every 20 seconds," http://www.si.edu/organiz/museums/zoo/hilights/webcams/molerat1/elecam/elecam10.htm.

* cited by examiner

METHOD AND APPARATUS FOR SURVEILLANCE USING AN IMAGE SERVER

CROSS-REFERENCES TO RELATED APPLICATIONS

This application claims priority from provisional application Ser. No. 60/131,990, filed Apr. 30, 1999, which is incorporated herein by reference.

BACKGROUND OF THE INVENTION

The present invention is in the field of electronic circuits and camera systems. More particularly, the present invention is directed to a system for surveillance using digital images and image servers.

Many types of camera surveillance systems are known. Typical building surveillance systems today capture analog video signals from one or more video cameras and transmit those signals to a security panel for viewing by security personnel. Deployment of such systems over a large area and making the video images available over a network can be problematic because of the large bandwidth requirements of the video signal. Monitoring of multiple analog cameras is also difficult; for example, a human viewer's attention may not be on the security panel or directed to the correct camera image at the time an incident occurs. An, in general, the number of cameras a human can effectively monitor is limited. While techniques for motion detection in surveillance systems are known, the complexity and expense of incorporating these techniques into analog systems has limited the use of motion detection in many video surveillance systems.

Another problem that arises in analog surveillance systems is storage and playback technology of analog video data. Typical security cameras, at a retail store for example, employ videotape technology wherein full-motion video is continuously recorded, without regard to whether an incident of interest has occurred. Video tapes are retrieved and played back on the rare occasions when an incident occurs. A major problem with such systems is that the videotapes are often recorded at the slowest speed, giving the poorest image quality, and are repeatedly rerecorded. As a result, playback image quality is often very poor and when an incident does occur, investigators cannot get a clear enough image of individuals involved in the incident to make an identification. In response to this problem, the Federal Bureau of Investigation has established a laboratory program whose primary function is to help law enforcement personnel enhance poor quality images from video surveillance systems in order to aid in investigations.

It is known to make digitized video images available over the web for presentation by a web browser. Generally, such systems periodically update a full-frame captured still image from a camera using a push (controlled at the server side) or a pull (controlled at the client side) technology. Such systems have had a limited deployment to make images of such things as ski slope weather conditions, elephant houses at a zoo, or children at a day care center, available over the web using a standard web browser. In some applications, such as the day care center, access to the image is password protected so that only authorized viewers can receive the images.

One group of cameras and camera servers for these applications are marketed under the brand name Axis. However, these installations are generally limited to single or a few cameras and do not have the ability to be deployed as a flexible and fully functional surveillance systems. Standard Axis technology also generally relies on full-frame updating and has only limited ability to reduce bandwidth of images.

A number of techniques are known for compressing digital video information. Well known techniques for digital video include hardware assisted techniques such as MPEG, DVI, Motion JPEG, and software-only techniques such as QuickTime, Video for Windows, RealVideo, or AVI. Some of these techniques include mechanisms for processing and transmitting delta frame information, wherein delta frames encode information about pixels that have changed between one frame and another. However, these compression techniques for the most part are concerned with the quality of reproduction of real-time video image and have not been optimized for use in surveillance systems or for use in systems that do not contain custom video playback software or hardware.

What is needed is a flexible surveillance system that can capture image data from a number of digital cameras and make that data available to viewers in a variety of different ways. In some applications, what is further needed, is a surveillance system with a basic architecture that is scalable, allowing for efficient installation, coordination, and control of one, to a few, to thousands of individual cameras and one to a few to thousands of individual clients. Additionally, what is needed is an integrated system for digital surveillance that at every step of image processing optimizes images for easy storage, analysis, transmission, and presentation in a surveillance system.

SUMMARY OF THE INVENTION

Specific embodiments of the present invention address a number of problems associated with a digital camera surveillance system, such as control and coordination of digital cameras that may be widely deployed, analyzing data from multiple cameras, making data available in such a way that it can be efficiently transmitted over a network and can be easily displayed to potentially a large number of users, and displaying and controlling image data by existing client software such as a browser. According to the invention, these problems are addressed by providing a flexible and scalable surveillance system and method; the method and system according to the present invention can work effectively in small installations with just a few cameras and only one viewer to installations including thousands of cameras, widely dispersed, allowing for selectable viewing by many viewers.

In a specific embodiment, the invention consists of the following functional elements:

(1) Multiple Frame Grabbers (FGs) that include one or more cameras, digital image capture circuitry, and low-level logic routines. In one embodiment, an FG comprises a PC equipted with one or more off-the-shelf video capture boards, with each video capture board connected to a camera. The PC is programed according to the invention, to control the video capture functions and to perform low-level logic processing. FG low-level logic processing generally includes one or more of the following: short-term storage of full images, computing of differential images, computing differential scores for a current image, filtering of gradual ambient light changes, and adjusting of camera characteristics. FGs have a communication interface to send full frames and differential frames to a coordinator.

(2) One or more Camera Coordinators for receiving full frames, differential frames, and possibly other data from FGs, storing this data, and for adding a higher level of image processing. Coordinators generally include logic for one or more of the following: detecting and storing an incident from one or more FGs, resolving incidents from multiple FGs into an incident sequence; image recognition; logging and cataloging incidents according to a rules-based engine; generating alarms to security personnel or a server, etc. A coordinator may also include an interface for sending control signals to the FG to control basic FG functions such as frequency of capture, focus, contrast, and, for moveable FGs, positioning.

(3) A Camera Server for providing an interface to one or more client viewers. A server handles image presentation and may include logic allowing a client to pan and zoom the view of an image. A server includes logic to provide an intelligent interface to a client viewer including launching windows in the client viewer when incidents are detected and updating open windows with differential frames and full frames. A server may also include an interface for receiving commands back from a client and forwarding those commands to a coordinator when appropriate. In some embodiments, a server also provides a possibly high capacity connection to the Internet, allowing potentially thousands of viewers to view the same image.

(4) One or more clients for displaying images delivered by the server. In some applications, clients may also receive commands from a user and forward results of those commands back to a server. In various embodiments of the invention, clients may be familiar, off-the-shelf, browser applications, such as Netscape Navigator or Internet Explorer, or clients may be proprietary applications. According to the present invention, where desired in a particular installation, both off-the-shelf and proprietary clients can simultaneously access image data.

According to the invention, these elements perform separable tasks appropriate to that element to allow for a flexible and scalable surveillance system. The flexible system according to the invention allows various data and image processing tasks to be easily incorporated into specific systems depending on application. In security surveillance systems where later authentication of a recorded digital image is important, for example, cameras and FGs can employ digital signature key technology or other technology to verify that an image was not altered after it was initially captured.

A further understanding of the invention can be had from the detailed discussion of specific embodiments below. For purposes of clarity, this discussion refers to digital devices and concepts in terms of specific examples. However, the method and apparatus of the present invention may operate with a wide variety of types of digital devices. It is therefore not intended that the invention be limited except as provided in the attached claims. Furthermore, it is well known in the art that logic systems can include a wide variety of different components and different functions in a modular fashion. Different embodiments of a system can include different mixtures of elements and functions and may group various functions as parts of various elements. For purposes of clarity, the invention is described in terms of systems that include many different innovative components and innovative combinations of components. No inference should be taken to limit the invention to combinations containing all of the innovative components listed in any illustrative embodiment in the specification, and the invention should not be limited except as provided in independent embodiments described in the attached claims.

The invention will be better understood with reference to the following drawings and detailed description.

DESCRIPTION OF THE SPECIFIC EMBODIMENTS

Overview of Two Typical Embodiments

Example Embodiment For a Large Campus

Figure 1:
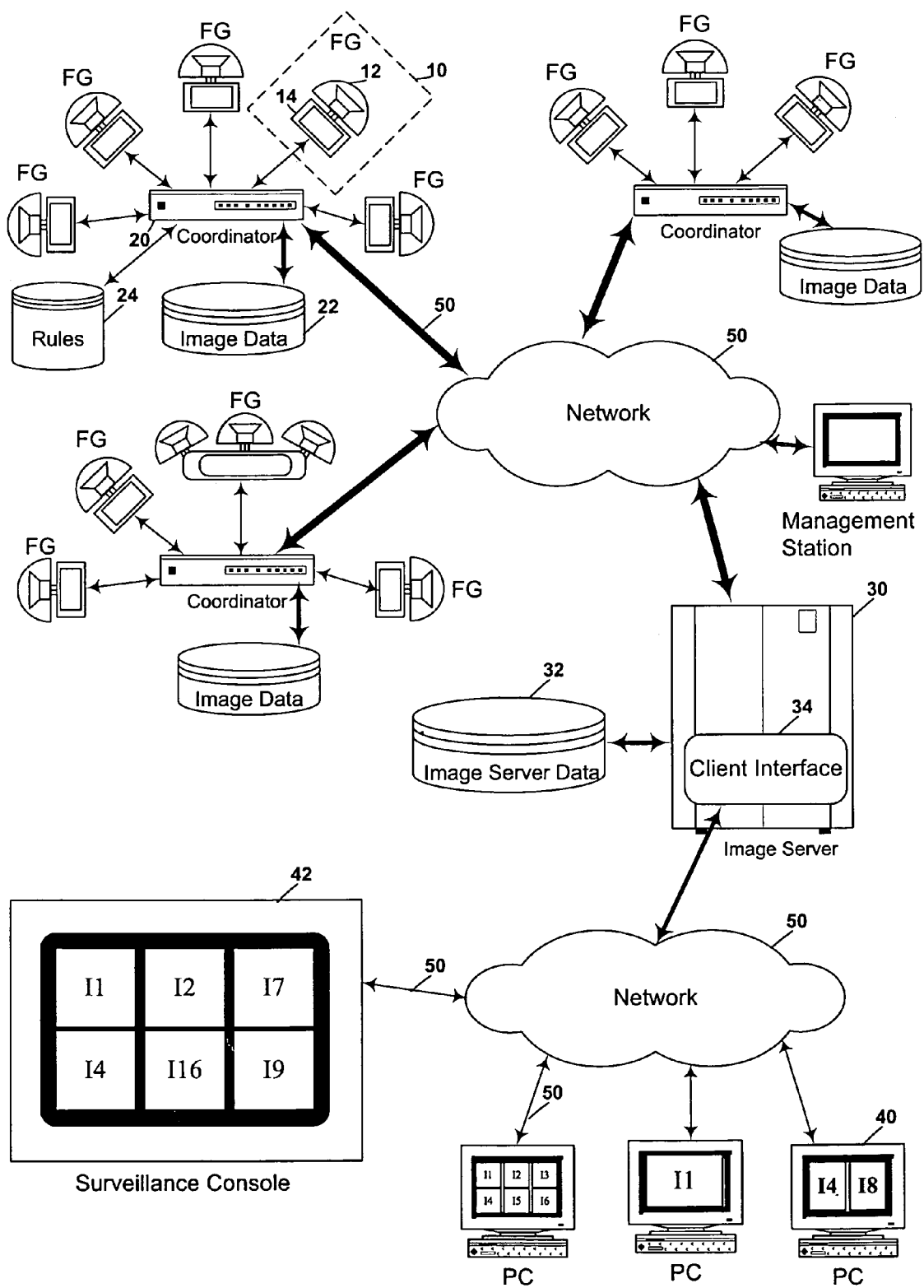
FIG. 1 is a diagram of an illustrative embodiment of the invention using representative hardware elements as it might be deployed in a moderately sized business or academic setting.

FIG. 1 shows an illustrative specific embodiment of a surveillance system according to the invention. Such a system consists of a number of frame grabbers (FGs) 10, each of which include one or more digital cameras 12 and controller 14. FGs are in communication with coordinator 20, which may coordinate one to many FGs. Coordinator 20 typically will include frame and incident storage 22 and may include rules storage 26. Coordinators 20 communicate with server 30, which will typically include server image storage 32 and client interface 34. Interface 34 communicates with one or more viewing clients 40–42. Client 40–42 may be standard, off-the-self client software allowing display of images and running on an appropriate computing device, such as a PC or workstation, web-capable television, etc. Well-known, currently available, browser clients include Netscape Communicator and Internet Explorer. One or more of clients 40–42 may also be propriety client programs and may include specialized hardware, such as panel 42, which may be a security surveillance panel or a kiosk display.

Connections 50 are shown in FIG. 1 to illustrate a functional data pathway between components. As is known in the art, such pathways can be network connections, backplane bus connections, wireless connections, IC interconnects, or any other data channel appropriate for a particular embodiment hardware configuration of the invention. According to the invention, the elements shown in FIG. 1 may be embodied in physically separable electronic devices, or alternatively, the elements may be embodied into a small number of more integrated physical devices. FGs 10, for example, may be constructed as a single electronic unit, with the camera and controller component sharing some of the same logic circuits. In some installations, some or all of coordinators 20 may exist as processes on the same computer that holds server 30. Conversely, as is known in the art, server 30 or coordinator 20 may be physically constructed of a number of closely cooperating computer hardware devices. Thus, FIG. 1 can be understood as an illustration of functional elements of the invention with functions performed on different arrangements of hardware components as appropriate to a particular installation.

Example Embodiment for a Small Site Installation

Figure 2:
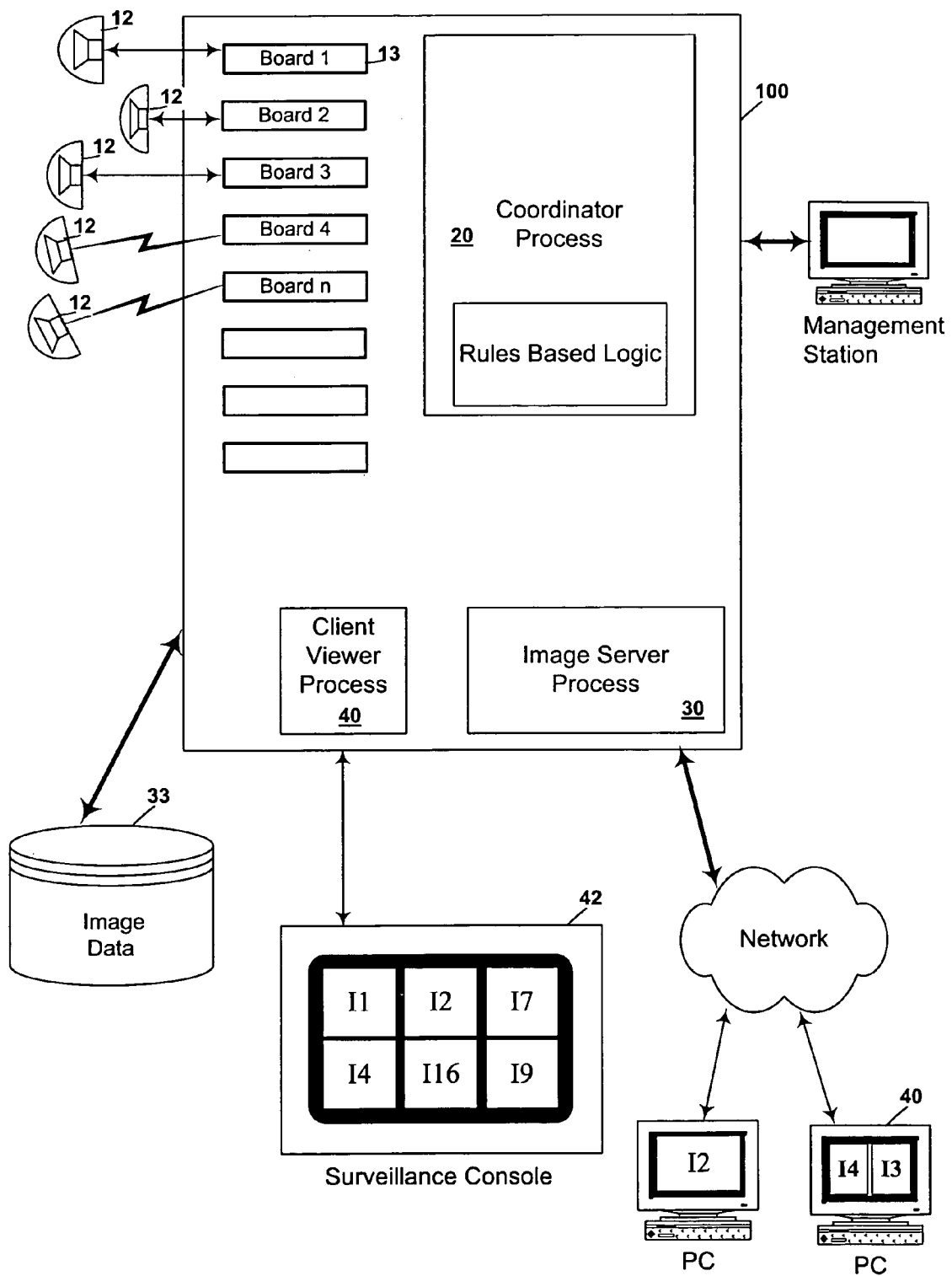
FIG. 2 is a diagram of an alternative embodiment of the invention using representative hardware elements as it might be deployed at a single location, such as a single moderately sized building.

FIG. 2 shows an alternative illustrative embodiment of a surveillance system according to the invention using a single computer 100 as a hardware platform. In this system, frame grabbers include one or more digital cameras 12 and video capture boards 13. Other functions of controller 14 are performed by logic running on computer 100.

Capture Boards 13 are distributed in bus slots in the computer and communicate with the camera either through a direct line or via wireless transceivers. Coordinator 20 exists as logic routines running on computer 100, using storage of the computer for frame and incident storage and any rule storage. Server 30 is also a process running on computer 100.

A client process 40 may also in some embodiments run on computer 100 to allow local viewing of captured images. Typically computer 100 will also have an image server 30 for remote client viewing. Interprocess communication in computer 100 allows for data exchange and in some cases data sharing between the various functional elements.

Components of a Surveillance System

Frame Grabber Camera

FG 10 includes an off-the-shelf or custom camera 12 capable of cooperating with other hardware to produce a digitally encoded image array. Many different types and brands of such cameras are available. Some of these cameras include a microphone and wireless transmission capability between the camera and the capture circuitry. For example, a currently available off-the-shelf Remington(™) brand audio/video sender/receiver combination allows for image/audio capture at low lux and wireless transmission to a capture board. Many such cameras employ either well-known CCD or CMOS technology to capture a digital image. It is expected that an even wider range of such cameras will be available in the future, with greater capabilities that will make them particularly suitable for use in some embodiments of the present invention. Camera hardware often includes "steady cam" technology that performs some corrections for vibrations of the camera.

In one desirable embodiment, camera 12 will generally be non-moving (i.e. fixed) and will be located to capture a view of interest. As is known in the art, camera 12 can be fitted with a wide-angle or "fish eye" lens to allow it to capture a large area. In such a case, software in the FG or in the coordinator or in the server is used to remove distortion caused by the lens and to flatten the captured image for viewing.

In some embodiments, an FG captures an image of a larger area than will typically be displayed at one time at a client. Logic routines in either the FG, the coordinator, or the server allow a client viewer to pan and zoom a view of the captured image.

Some capabilities of FG cameras that are either presently available or are anticipated soon to be available are the ability to capture frames of 15 million pixels allowing for greater zooming capability; the ability to operate at very low light levels, and the ability to capture infrared radiation or other non-visible electromagnetic radiation and the ability to capture synched audio data. Camera hardware often includes "steady cam" technology that performs some corrections for vibrations of the camera.

As is known in the art, CCD-type video digital cameras generally produce an analog video scan signal, which must converted to digital for digital processing or storage. However, it is expected that cameras will increasingly become available that produce a byte-stream or bit-stream description of the detected image.

Frame Grabber Controller

Image Capture and Standard Image Encoding

Controller 14 includes capture circuitry and low-level processing and control logic immediately associated with the camera to allow for an efficient and flexible overall system. In one embodiment, controller 14 may be a PC-type microcontroller with an off-the-shelf, programmable, video capture board. In an alternative embodiment, controller 14 may include or be comprised of custom designed logic circuits. Controller 14 captures, and for a short time stores, sequential still images from the camera in the form of digital data. For analog output cameras, controller 14 converts the analog signal to digital.

As is know in the art, video capture boards receive a video signal and convert it to still digital frames at a selectable frame rate. Generally, the still digital frames are encoded as full-color images and the capture board may perform some low-level color and brightness correction of the received signal. The capture board delivers, on demand, digital captured frames. In some capture boards, the image delivered is compressed and converted to an encoded format such as GIF or JPEG while in others only 24 bit color is possible. Off-the-shelf video capture boards brands include Videum and ATI.

Digital encoding of images can take many different forms. One well-known, uncompressed form for full-color digital images is a two dimensional array of numerical pixel values, with each pixel holding three 8-bit numerical values, one value indicating Red intensity, one Green, and one Blue. Thus, each pixel requires 24 bits of data and can represent one of $2^{24}$ (16 million) different colors and an uncompressed, 24-bit image with an image size 640×800 pixels requires 1.5 Mbytes of storage. Other encoding schemes are known, such as schemes that use fewer bits for each color value, and schemes that use different numbers of bits for different colors.

One well known technique for image compression can be generally referred to as the table/substitution technique. In this technique, the total number of colors actually displayed in a single image is reduced from 16 million to a smaller number, such as 256. A palette or table is created by analyzing the original 16 million color image and selecting 256 of those colors for display. Those selected 256 colors are then stored in a 256 entry indexed palette and the index number (in one known method, an 8-bit number) for a color is substituted as the pixel value for that color. The substituted pixel image and the palette are then used to represent the image, reducing a 1.5 Mbyte image to closer to 0.5 Mbytes. In many known encoding formats, compression techniques are used to further reduce the storage needed for an encoded image. In some table/substitution schemes, certain table values are reserved for predefined colors. Pure black and pure white are commonly reserved colors. In some schemes, a value is also reserved for a transparent pixel.

Processing Captured Frames

Once an image is captured, the FG controller processes the captured image and determines whether to send to the camera coordinator a full frame, a computed differential frame, or no frame. This determination may be based the amount of change between the captured image and a previously transmitted image, the elapsed time since the previous transmit, the number differential frames sent since the previous full frame, or other criteria. In one embodiment, a frame grabber also transmits differential scores that indicate an amount of change in the current frame from the previous frame.

A number of variations in the processing of captured images to generate differential frames are possible according to the invention, and processing steps can take place in various orders or in parallel. For ease of understanding, the following description is provided of an exemplary specific embodiment processing.

Basic processing according to the invention involves a reference frame and a current frame, which are generally images of the same size and same encoding. The current frame is the frame newly captured by the capture board. The reference frame is a frame held in memory at the controller to which the current frame will be compared.

Computing Differential Scores

A differential score is determined for a current frame by determining which pixels in the current frame have a different value from the corresponding pixels in the reference frame. A number of variations in computing and expressing differential scores are possible. A raw differential percentage score may be computed by comparing each bit in the current frame to the corresponding bit in the reference frame. If there is any difference in value, that pixel is considered a changed pixel. The ratio of the sum of all changed pixels to the total number of pixels in the image is the raw differential percentage score.

A differential percentage score may also be computed using threshold logic routines to filter out differences between pixels that are not of interest, such as when a change is of minor intensity, or only affects a very small area. Threshold algorithms can be defined in a variety of ways appropriate to the particular overall image conditions and applications. Thresholds can be defined that are different for different colors, such that a change in a green or red value, for example, is more likely to cause a pixel to be counter as different than a change in a blue value.

In a further embodiment, the controller may analyze an image by dividing the image into cells of roughly 5×5 pixels and determining the number of 5×5 cells in the current image that have changed compared to the reference image and generating a differential score from this comparison.

In a further embodiment, threshold logic can compare a current frame to more than one previous frames in order to determine whether captured values are "flickering" while the actual image before the camera is unchanged. Such flickering is common in low light situations.

The controller may compute more than one type of differential score for an image. A differential score may be used by the controller to determine whether or not to transmit a frame according to the controller's rule set and whether or not the controller believes an incident has occurred. One or more differential scores may be transmitted along with frames transmitted by the controller to the coordinator.

Creating Differential Frames

A differential frame is constructed of the same size as the captured image and a reference image, using the same or a similar file format. In the differential frame, pixel values from the current frame that are identical to or within tolerances of the reference frame are set to a value indicating transparency and pixels that have changed retain the value from the newly captured image. This allows for a high compression of the differential frame and for easy updating at a client viewer by superimposing a series of differential frames over a displayed full frame, as discussed below. Once the differential frame has been constructed, the controller can perform a still image compression routine. In many image formats, this compression routine is built into the format.

Other Controller Operation

As can be seen from above, in a simple and compact embodiment, a controller can operate with only two full frames in memory, a current frame and a reference frame, and a buffer for holding differential frames. As discussed above, in an alternative embodiment, the controller may retain additional image files to maintain a history of image processing for retransmission purposes or for more involved threshold and image analysis.

The process of computing one or more differential scores and constructing a differential frame may be combined such that as the controller scans the pixels in the captured image frame, it computes differential scores and builds a differential frame.

From time to time, and whenever requested by a coordinator, a controller will transmit a current full frame. Among other functions, this allows the coordinator to catch up pixels that changed so gradually over time that they never registered as differential pixels. In one embodiment, a full frame is sent every 10 images.

The controller logic may perform a number of other image processing functions as known in the art, such as converting the captured visual image into a different format. One format that may be advantageously used is the well-known GIF format for encoding and compressing digital images. Other suitable formats include PNG, JPEG, etc.

Moving Camera

In a preferred embodiment of the present invention, the camera is motionless. This allows for simpler control and processing logic and for easier detection of incidents and computation of differentials. Any panning or zooming for viewing the image is accomplished not by the camera itself, but by logic functions closer to the client viewer, as described below.

In an alternative embodiment, the invention may include moving or moveable cameras. When a camera is moving, techniques that take into account movement of the camera are used to compute the differential or computing of the differential can be suspended during camera movement and full captured images can be transmitted.

Camera Coordinator

Coordinator 20 receives frame data and possibly other control data from one or more FGs. According to one embodiment of the invention, frame data is in the form of still images, including full (update) frames and differential frames and may include differential scores from some or all frames. Control data may include data indicating that the FG detected a differential. It may also include data indicating the current position or focus depth of a moveable FG, an FG identifier, and a time signal. Transmission of frames to the coordinator can take according to one or more of the following: at expiration of a time interval since the last transmission, upon detection of a difference at a controller, at the request of the coordinator.

Coordinator 20 in one embodiment also may send commands to the FGs to control aspects of frame acquisition or transmission. Such commands may include a resend, change camera characteristics such as brightness or contrast, send a full frame, set the frequency for frame transmission, establish rules regarding when frames should be transmitted, establish a tolerance level for determining if a differential frame should be transmitted, etc.

In a particular embodiment, the coordinator will include an interface allowing a user to program certain features of the controller, such as indicating regions of the visual field that should be processed differently. For example, the coordinator might be able to receive user commands allowing a user to indicate that pixel changes in certain regions, such as windows or doorways, are not of interest during certain hours.

In one embodiment, a coordinator is primarily responsible for determining if an incident occurred. The coordinate accomplishes this using a rules-based engine or similar logical process that may take into account time of day, day of the week, nature of the pixel change detected, etc. In determining that an incident has occurred, the coordinator takes into account differential scores transmitted by the FG.

In one embodiment, the coordinator also provides the principal incident and history database for its connected cameras and includes the ability to playback stored incidents. In further embodiments, the coordinator additionally has the ability to connect multiple incidents, triggered at multiple cameras, into an incident sequence. The coordinator has positional and view information about each camera and information about overlapping regions of cameras. A coordinator will generally include a large amount of longer term, non volatile storage, such as large disk drives or removable storage technologies such as tape, or write/once or r/w CDs or DVDs.

In embodiments with a large number of cameras, a coordinator will be a work horse machine accomplishing much of the computation-intensive processing needed by the system. As a result, a coordinator in such a system may be constructed of a number of cooperating computers or a multi-CPU computer system. A coordinator handles the principal time-stamping function for frames or incidents.

The coordinator includes a management interface to a management station 26, which may be local to the coordinator or may connect remotely. The management interface allows a user to perform various management functions, such as setting time parameters for whether incidents from particular cameras will be of interest, establishing other rules definitions. Alerts regarding cameras that have not reported in for a while (exception) report generation. Installing new software and other maintenance functions. The management station reports on its interactions with the camera server, such as cameras that have been accessed and how frequently and it receives commands from the camera server.

The coordinator can also perform advanced image processing tasks such as image recognition or tracking a person or object identified in an image or determining that an object is coming toward or moving away from the camera. The camera coordinator sends commands to the camera server regarding detected incidents or changes of an image that allow the server to intelligently control the view of connected clients by changing the view of images displayed at the clients or by creating new windows and directing images to those new windows.

Image Server

A principal function of image server 30 is image delivery to client software for presentation to an observer. In a particular embodiment, the server can force a client to create new windows and can direct incidents to different windows. In a preferred embodiment, the server employs push technology, wherein the server can periodically deliver a differential image to the browser. The server's delivery of full images and differentials allows a client viewer to display a pseudo real time representation of the image seen by the camera by overlaying the differential images on the existing displayed image, with a minimum of processing and a minimum of transmission between the server and the client.

A server includes cache storage and may keep a current full frame in memory for all active attached cameras so that the server can transmit a full frame on demand when a client requests it. The image server typically includes software with the ability to perform pan and zoom functions of an image.

In one embodiment, a server has the necessary logic to talk to Java code, or similar code, running in the client. This allows a server to determine if it should send a new image, such as to a newly connected client. The newly connected client will receive a full frame and enough differential frames to get synchronized with the current view.

Prior art systems for transmitting moving images such as mpeg or the I-see-you,-you-see-me system suffer from utilizing a more complex encoding scheme requiring more specialized hardware and software interfaces on both the captured end and the received end. The present invention benefits from the wide distribution of image viewing systems using simple static image coding in compression formats.

It receives commands from the client that it passes on to the coordinator. Requests for information. Initiate of image streams. Termination of last image stream.

According to the invention, a surveillance system may be built with a low-speed/low-bandwidth connection between the FGs and the coordinator, a high-speed/high-bandwidth connection between the coordinators and the server, and low-speed connections with individual clients.

Client Viewer

In one embodiment, client viewers 40 can include off-the-shelf PC's running off-the-shelf internet browsers. Preferably, the browsers will be JAVA-enabled to allow image server 30 to switch views or create new windows.

Clients can also include custom surveillance consoles, such as 42. These consoles can coexit in a networked environment with other viewers.

Figure 3:
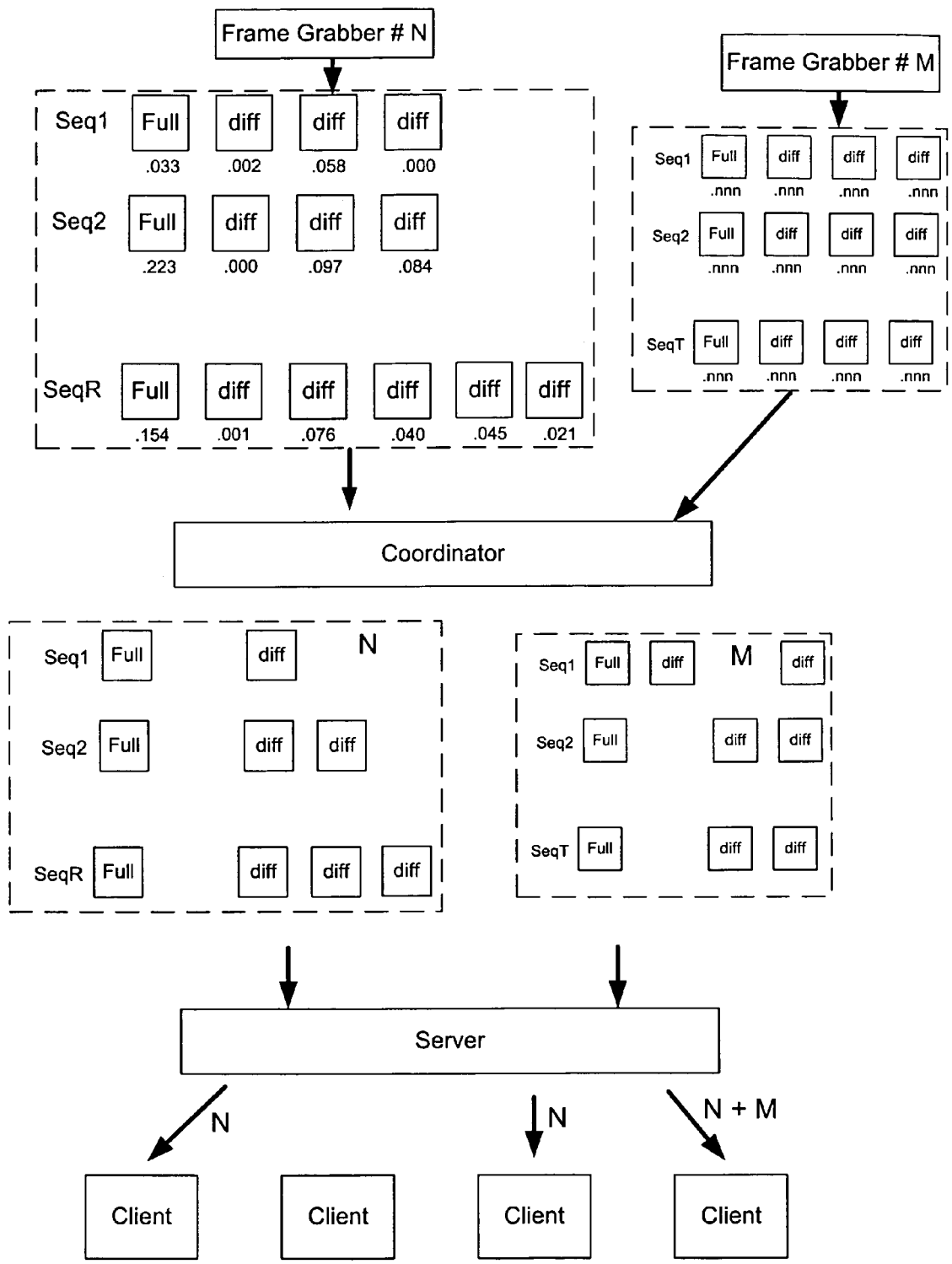
FIG. 3 is an illustrative functional diagram of an embodiment of the invention.

FIG. 3 is an illustrative block diagram showing exemplary frame handling according to a specific embodiment of the invention. It will be clear to those of skill in the art that many variations in image and frame handling within the scope of the invention are possible.

What is claimed is:

1. A method of viewing image data from a plurality of cameras comprising:
   at said cameras, capturing data sets representing images;
   at said cameras, periodically transmitting said data sets to a plurality of camera coordinators, a plurality of said camera coordinators each receiving data sets from multiple cameras;
   at said camera coordinators, determining whether one or more of said data sets is of interest;
   transmitting data sets of interest from said camera coordinators over a network to an image server, said image server not local to one or more of said cameras; and
   providing said data sets from said image server for viewing by a user.
   and further wherein:
   said coordinators include an incident and history database from which their connected cameras can playback stored incidents;
   said coordinators can connect multiple incidents, triggered at multiple cameras, into an incident sequence;

said coordinators have positional and view information about each camera and information about overlapping regions of cameras;

said coordinators perform time-stamping for data sets and/or incidents;

providing a management interface allowing a user to perform various management functions, including setting time parameters for whether incidents from particular cameras will be of interest, establishing other rules definitions; specifying alerts regarding cameras that have not reported; installing new software and other maintenance functions;

said coordinators performing advanced image processing tasks including image recognition or tracking a person or object identified in an image or determining that an object is coming toward or moving away from one or more of its connected cameras.

2. The method according to claim 1 further comprising:
storing one or more sequences at said image server.

3. The method according to claim 1 further wherein:
said camera coordinators include logic for performing two or more of the following on data sets from multiple of said cameras:
   detecting an incident comprising one or more data sets from a camera;
   resolving incidents from multiple cameras into an incident sequence;
   image recognition;
   logging and/or cataloging incidents according to a rules-based engine; or
   generating security alarms.

4. The method according to claim 1 further wherein:
said camera coordinators include an interface for sending control signals to one or more cameras to affect one or more camera functions.

5. The method according to claim 1 further wherein said camera functions comprise one or more selected from the group:
   frequency of image capture, focus, contrast, or positioning for moveable cameras.

6. The method according to claim 1 further wherein said control signals comprise one or more selected from the group:
   resend, change camera characteristics such as brightness or contrast, set the frequency for frame transmission, establish rules regarding when frames should be transmitted, or adjusting tolerance levels for determining if an alarm should be transmitted.

7. The method according to claim 1 further wherein:
said camera coordinators receive and process control data from one or more cameras.

8. The method according to claim 7 further wherein:
said control data includes one or more items selected from the group consisting of:
an indication that a camera detected a differential;
data indicating current position or focus depth of a moveable camera;
a camera identifier; or
a time signal of a camera at a given frame capture.

9. The method according to claim 1 further wherein:
transmission of data sets from a camera to a coordinator can be occasioned by one or more of the following:
expiration of a time interval since the last transmission;
detection of a difference at a controller; or
at the request of the coordinator.

10. The method according to claim 1 further wherein:
said coordinators determine if an incident occurred by using a logical process accounting for time of day, day of the week, nature of the pixel change detected, and data sets received from said cameras.

11. The method according to claim 1 further wherein:
said camera coordinators indicate to said server detected incidents or changes of an image that allow said server to intelligently control a view of one or more connected clients by changing the view of images displayed at the clients or by creating new windows and directing images to those new windows.

12. A surveillance system comprising:
a plurality of cameras able to capture data sets representing images;
said cameras periodically transmitting said data sets to a plurality of camera coordinators, a plurality of said camera coordinators each receiving data sets from multiple cameras;
said camera coordinators including logic modules able to determine whether one or more of said data sets is of interest based on analysis of said data sets representing images;
an image server not local to one or more of said cameras able to receive data sets of interest from said camera coordinators over a network and able to provide said data sets for viewing by a user;
data storage operationally connected to said image server for holding multiple data sets of interest for viewing by a user;
further wherein:
said system includes an incident and history database from which to playback stored incidents;
said coordinators can connect multiple incidents, triggered at multiple cameras, into an incident sequence;
said coordinators have positional and view information about each camera and information about overlapping regions of cameras;
said coordinators perform time-stamping for data sets and/or incidents;
said coordinators performing advanced image processing tasks including image recognition or tracking a person or object identified in an image or determining that an object is coming toward or moving away from one or more of its connected cameras; and
a management interface allowing a user to perform various management functions, including setting time parameters for whether incidents from particular cameras will be of interest, establishing other rules definitions; specifying alerts regarding cameras that have not reported; installing new software and other maintenance functions.

13. The system of claim 12 further wherein:
said camera coordinators include logic for performing two or more of the following on data sets from multiple of said cameras:
   detecting an incident comprising one or more data sets from a camera;
   resolving incidents from multiple cameras into an incident sequence;
   image recognition;
   logging and/or cataloging incidents according to a rules-based engine; or
   generating security alarms.

14. The system of claim 12 further wherein:

said camera coordinators include an interface for sending control signals to one or more cameras to affect one or more camera functions.

15. The system of claim 14 further wherein:

said camera functions comprise one or more selected from the group:

frequency of image capture, focus, contrast, or positioning for moveable cameras.

said control signals comprise one or more selected from the group:

resend, change camera characteristics such as brightness or contrast, set the frequency for frame transmission, establish rules regarding when frames should be transmitted, or adjusting tolerance levels for determining if an alarm should be transmitted.

16. The system of claim 12 further wherein:

said camera coordinators receive and process control data from one or more cameras.

17. The system of claim 12 further wherein:

said control data includes one or more items selected from the group consisting of:

an indication that a camera detected a differential;

data indicating current position or focus depth of a moveable camera;

a camera identifier; or a time signal of a camera at a given frame capture.

18. The system of claim 12 further wherein:

transmission of data sets from a camera to a coordinator can be occasioned by one or more of the following:

expiration of a time interval since the last transmission;

detection of a difference at a controller; or at the request of the coordinator.

19. The system of claim 12 further wherein:

said coordinators determine if an incident occurred by using a logical process accounting for time of day, day of the week, nature of the pixel change detected, and data sets received from said cameras.

20. The system of claim 12 further wherein:

said camera coordinators indicate to said server detected incidents or changes of an image that allow said server to intelligently control a view of one or more connected clients by changing the view of images displayed at the clients or by creating new windows and directing images to those new windows.

* * * * *

UNITED STATES PATENT AND TRADEMARK OFFICE
CERTIFICATE OF CORRECTION

PATENT NO.       : 7,124,427 B1
APPLICATION NO.  : 09/482181
DATED            : October 17, 2006
INVENTOR(S)      : Daniel Esbensen Page 1 of 1

It is certified that error appears in the above-identified patent and that said Letters Patent is hereby corrected as shown below:

Claim 1, col. 10, line 61, please delete the extraneous period after the word "user".

Claim 15, col. 13, line 9, please delete the extraneous period after the word "camera".

Signed and Sealed this

Fourteenth Day of April, 2009

JOHN DOLL
*Acting Director of the United States Patent and Trademark Office*